United States Patent
Min et al.

(10) Patent No.: US 7,489,619 B2
(45) Date of Patent: Feb. 10, 2009

(54) PROBE POSITION ERROR DETECTING METHOD AND APPARATUS IN PROBE-BASED DATA STORAGE SYSTEM

(75) Inventors: Dong-ki Min, Seoul (KR); Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 609 days.

(21) Appl. No.: 11/202,242

(22) Filed: Aug. 12, 2005

(65) Prior Publication Data

US 2006/0044958 A1    Mar. 2, 2006

(30) Foreign Application Priority Data

Aug. 14, 2004    (KR)    ............ 10-2004-0064123

(51) Int. Cl.
*G11B 9/00*    (2006.01)
(52) U.S. Cl. ................................ 369/126; 977/947
(58) Field of Classification Search ............. 944/943, 944/947
See application file for complete search history.

(56) References Cited

U.S. PATENT DOCUMENTS

| | | | | |
|---|---|---|---|---|
| 5,132,934 A * | 7/1992 | Quate et al. | ............... | 369/126 |
| 5,202,879 A * | 4/1993 | Oguchi et al. | ............... | 369/126 |
| 5,384,671 A * | 1/1995 | Fisher | ............... | 360/51 |
| 5,396,483 A * | 3/1995 | Matsuda et al. | ............... | 369/283 |
| 5,404,349 A * | 4/1995 | Nose et al. | ............... | 369/126 |
| 5,856,967 A * | 1/1999 | Mamin et al. | ............... | 369/126 |
| 6,195,313 B1 * | 2/2001 | Seki et al. | ............... | 369/44.11 |
| 6,304,398 B1 * | 10/2001 | Gaub et al. | ............... | 360/49 |
| 6,370,107 B1 * | 4/2002 | Hosaka et al. | ............... | 369/275.4 |
| 7,050,249 B1 * | 5/2006 | Chue et al. | ............... | 360/49 |
| 2003/0035361 A1 | 2/2003 | Knight et al. | | |
| 2003/0218960 A1 * | 11/2003 | Albrecht et al. | ............... | 369/126 |
| 2006/0291271 A1 * | 12/2006 | Stark et al. | ............... | 365/151 |

OTHER PUBLICATIONS

Savage. "A Survey of Combinatorial Gray Codes." Siam Review, col. 39, No. 4, Dec. 1997, pp. 605-629.
Hong et al. "Resistive Probe Storage: Read/Write Mechanism." Scanning Probe Microscopy, - Electrical and Electromechanical Phenomena at the Nanoscale, Part IV, Chapter 6, Apr. 1997, pp. 943-973.
Eleftheriou et al. "Millipede-A Mems-Based Scanning-Probe Data-Storage System," Transactions on Magnetics, vol. 39, No. 2, Part 1, Mar. 2003, pp. 938-945.

* cited by examiner

*Primary Examiner*—Peter Vincent Agustin
(74) *Attorney, Agent, or Firm*—Sughrue Mion, PLLC

(57) ABSTRACT

A probe position error detecting method and apparatus in a probe-based data storage system are provided. The method includes preparing servo codes, which are Gray codes. The Gray codes have a Hamming distance of 1 and satisfy alternate conditions for Q (a natural number) and Q+1, the conditions being based on the numbers of "1" bits of codewords of the Gray codes. The method further includes detecting a probe position error from a signal read by a servo probe when the servo probe consecutively scans "1" bits of codewords of the servo codes when tracking. The apparatus includes: a plurality of servo probes; a tracking condition checker; a plurality of position error detectors that correspond to the plurality of servo probes, respectively; and an average position error calculator. Probe position errors are be detected with a stable noise characteristic using fewer probes.

18 Claims, 13 Drawing Sheets

PROBE POSITION ERROR DETECTING METHOD AND APPARATUS IN PROBE-BASED DATA STORAGE SYSTEM

BACKGROUND OF THE INVENTION

This application claims priority from Korean Patent Application No. 10-2004-0064123, filed on Aug. 14, 2004, in the Korean Intellectual Property Office, the disclosure of which is incorporated herein in its entirety by reference.

1. Field of the Invention

Apparatus and methods consistent with the present invention relate to probe-based data storage, and more particularly, to probe position error detection in a probe-based data storage system.

2. Description of the Related Art

A probe-based data storage device using a scanning probe microscopy (SPM) technology includes: a data storage medium; a probe, including a conductive tip for writing on or reading from the data storage medium and a cantilever in which the conductive tip is installed; an xy stage (scanner), carrying the data storage medium; a controller, controlling the probe and the xy stage; and a signal processor for the controller. In order to write and read data with high density and accuracy, a data tracking method having resolution greater than the size of unit data is required.

A conventional method of tracking a data position for writing or reading data in a probe-based high density data storage device using the SPM technology can be classified in the following three methods.

The first one is a method using mechanical or electrical signals from a data storage medium, which are distinguished from data to be written or read. This method is disclosed in U.S. Pat. Nos. 5,132,934, 5,396,483, 5,856,967, and 6,370,107, which teach forming of metal patterns or mechanical grooves on a data storage medium. However, it is difficult to precisely form the patterns or grooves on a data storage medium. Also, since mechanical grooves are used in a data read and write mechanism, a practical application range is narrow.

The second one is a method of displacing a center position of data recorded on a data storage medium by vibrating a probe or the data storage medium. This method, disclosed in U.S. Pat. No. 5,404,349, uses a modulation and demodulation scheme by vibrating a data storage medium with high frequency. However, it is difficult to vibrate a data storage medium with high frequency, and since the modulation and demodulation scheme is used, a detection circuit is complicated, and a detection time is delayed.

The third one is a method of using relative displacement between a center position of data recorded on a data storage medium and a probe writing or reading the data. This method, disclosed in U.S. Pat. Nos. 5,202,879 and 6,195,313, is disadvantageous in that data patterns must be very precisely recorded on a data storage medium. Particularly, since data cannot be continuously tracked according to U.S. Pat. No. 5,202,879, a data tracking speed is low. Accordingly, this method is very sensitive to external environments.

SUMMARY OF THE INVENTION

The present invention provides a probe position error detecting method and apparatus in a probe-based data storage system, which detects position errors with a stable noise characteristic using a small number of probes by using servo codes in order to easily synchronize a data center position of a probe-based data storage medium with a write/read timing and to easily compensate for tracking error.

According to an aspect of the present invention, there is provided a probe position error detecting method in a probe-based data storage system, which includes a data storage medium and a probe detecting data by scanning the data storage medium, the method comprising: preparing servo codes, which are Gray codes having a Hamming distance of 1 and satisfying alternate conditions for Q (a natural number) and Q+1, which are the numbers of "1" bits of codewords of the Gray codes; and detecting a probe position error from a signal read by a servo probe when the servo probe consecutively scans "1" bits of codewords of the servo codes when tracking.

According to another aspect of the present invention, there is provided a probe position error detecting method in a probe-based data storage system, which includes a data storage medium and probes detecting data by scanning the data storage medium, the method comprising: (a) preparing servo codes, which are Gray codes, having a Hamming distance of 1 and satisfying alternate conditions for Q (a natural number) and Q+1, which are the numbers of "1" bits of codewords of the Gray codes; (b) detecting position errors of a plurality of servo probes from signals read by the plurality of servo probes; (c) determining whether each of the plurality of servo probes satisfies a tracking condition of consecutively scanning "1" bits of codewords of the servo codes; and (d) calculating an average position error by averaging probe position errors corresponding to servo probes satisfying the tracking condition.

The servo codes of operation (a) may further satisfy a condition that codewords of the servo codes are unique.

Operation (b) may comprise: (b1) separating its associated probe position error from a signal read by each servo probe; and (b2) integrating the separated probe position errors over predetermined units of time.

Operation (b1) may multiply a signal read by each servo probe by a predetermined error separation signal for separating its associated probe position error.

The error separation signal may be a square wave having a period determined by a ratio of a distance between data bits of the data storage medium to a scanning speed of the servo probe and having a 50% duty cycle.

The error separation signal may comprise: a horizontal error separation signal, which is a square wave having a period determined by a ratio of a distance between data bits of the data storage medium to a scanning speed of the servo probe and having a 50% duty cycle; and a vertical error separation signal, which has double the period of the horizontal error separation signal and is synchronized with the horizontal error separation signal. And operation (b1) may comprise: multiplying a signal read by the servo probe by the horizontal error separation signal; and multiplying the signal read by the servo probe by the vertical error separation signal. And operation (b2) may comprise: integrating a multiplication value of the horizontal error separation signal for a predetermined time; and integrating a multiplication value of the vertical error separation signal for a predetermined time.

According to another aspect of the present invention, there is provided a probe position error detecting apparatus in a probe-based data storage system, including a data storage medium and a probe detecting data by scanning the data storage medium, the apparatus comprising: a servo probe scanning a servo field of the data storage medium; a tracking condition checker that checks a tracking condition that the servo probe consecutively scans "1" bits of codewords of the servo codes when servo codes are prepared, the servo codes being Gray codes, having a Hamming distance of 1 and satisfying alternate conditions for Q (a natural number) and Q+1, where the conditions are based on the numbers of "1" bits of codewords of the Gray codes; and a position error detector that detects a probe position error from a signal read by the servo probe satisfying the tracking condition.

The servo codes may further satisfy a condition that codewords of the servo codes are unique.

According to another aspect of the present invention, there is provided a probe position error detecting apparatus in a probe-based data storage system including a data storage medium and probes detecting data by scanning the data storage medium, the apparatus comprising: a plurality of servo probes; a tracking condition checker that, when servo codes, which are Gray codes, whose Hamming distance is 1 and satisfy alternate conditions for Q (a natural number) and Q+1, which are the numbers of "1" bits of codewords of the Gray codes, are prepared, checks a tracking condition that the servo probes consecutively scan "1" bits of codewords of the servo codes when tracking; a plurality of position error detectors that correspond to the plurality of servo probes, respectively, and detect probe position errors from signals read by the plurality of servo probes; and an average position error calculator that calculates a mean value of position errors corresponding to servo probes, which consecutively scanned "1" bits, determined by the tracking condition checker among the position errors detected by the plurality of position error detectors.

The servo codes may further satisfy a condition that codewords of the servo codes are unique.

Each of the position error detectors may comprise: a position error separator separating a probe position error from a signal read by its associated servo probe; and a position error summer summing position errors detected by the position error separator for a predetermined unit of time.

The position error separator may be a multiplier, multiplying the signal read by the servo probe by a predetermined error separation signal for separating the probe position error. The position error summer may be an integrator, integrating a signal output from the multiplier in one cycle unit of the error separation signal.

The error separation signal may be a square wave having a period determined by a ratio of a distance between data bits of the data storage medium to a scanning speed of the servo probe and having a 50% duty cycle.

The error separation signal may comprise: a horizontal error separation signal, which is a square wave having a period determined by a ratio of a distance between data bits of the data storage medium to a scanning speed of the servo probe and having a 50% duty cycle; and a vertical error separation signal, which has double the period of the horizontal error separation signal and is synchronized with the horizontal error separation signal. And the multiplier may comprise: a horizontal multiplier multiplying a signal read by the servo probe by the horizontal error separation signal; and a vertical multiplier multiplying the signal read by the servo probe by the vertical error separation signal. The integrator may comprise: a horizontal integrator integrating a signal output from the horizontal multiplier; and a vertical integrator integrating a signal output from the vertical multiplier.

According to another aspect of the present invention, there is provided a computer readable medium having recorded thereon a computer readable program for performing the probe position error detecting method.

BRIEF DESCRIPTION OF THE DRAWINGS

The above and aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will now be described more fully with reference to the accompanying drawings, in which exemplary embodiments of the invention are shown.

Figure 1A:
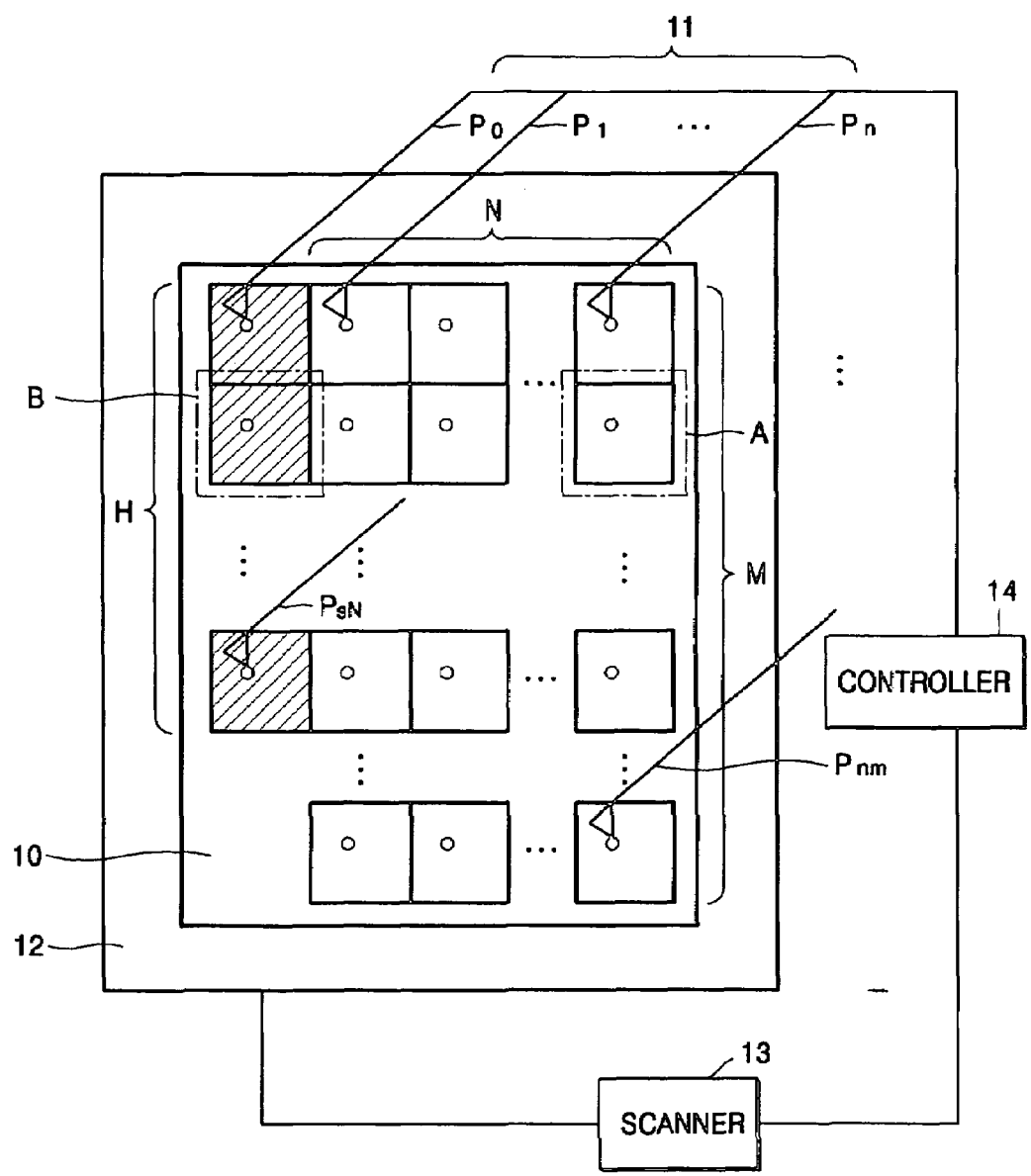
FIG. 1A is a block diagram of a data storage device.

FIG. 1A is a block diagram of a data storage device. Referring to FIG. 1A, the data storage device includes a data storage medium 10, probes 11 including tips for writing and reading data on and from the data storage medium 10. The data storage medium 10 is located on a stage 12, and the stage 12 is driven by receiving signals from a controller 14.

The data storage medium 10 is classified into N×M data fields A, where data can be written, and H servo fields B, having position information of the data fields A, N×M probes and H probes are prepared, respectively. In general, each probe 11 includes a tip contacting, or located at a predetermined distance apart from, a recording surface of the data storage medium 10 and a cantilever supporting the tip.

Figure 1B:
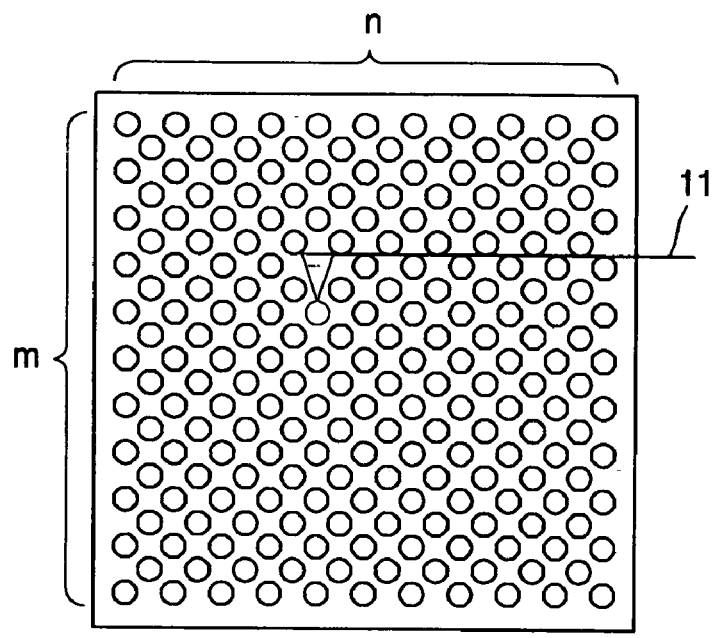
FIG. 1B illustrates a data field A of FIG. 1A.
Figure 1C:
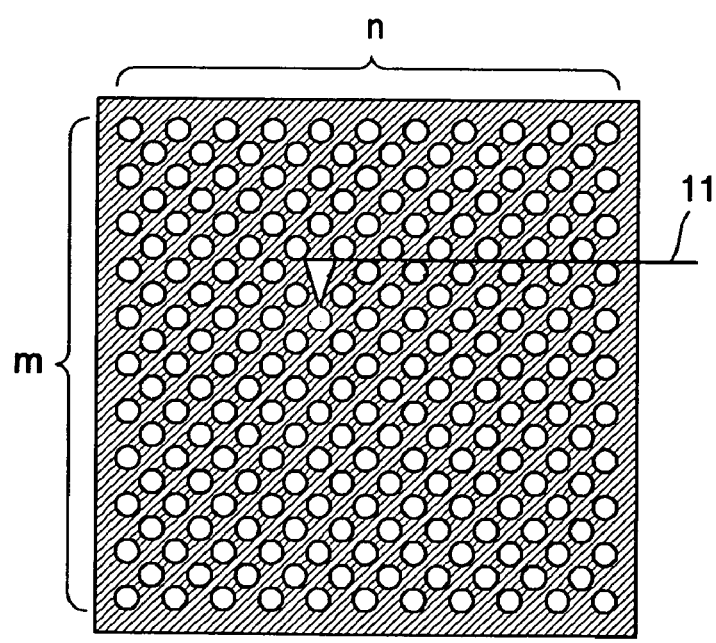
FIG. 1C illustrates a servo field B of FIG. 1A.
Figure 1D:
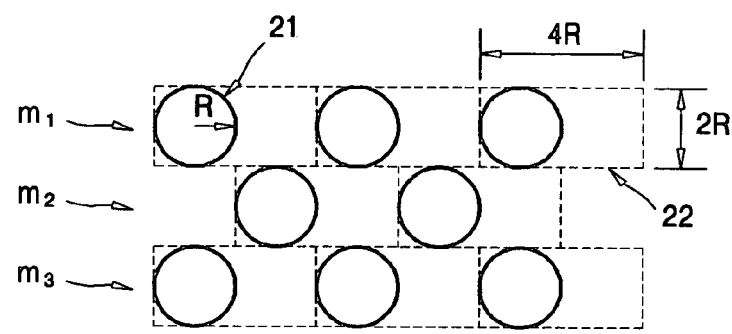
FIG. 1D illustrates a set of unit cells existing in three rows m1, m2, and m3.

FIG. 1B illustrates a data field A of FIG. 1A, and FIG. 1C illustrates a servo field B of FIG. 1A. Referring to FIG. 1B, the data field A includes n×m data unit cells. Referring to FIG. 1C, the servo field B includes n×m servo unit cells. The probes 11 move above these data unit cells and servo unit cells and write or read data on or from each unit cell. FIG. 1D shows a detailed portion of these unit cells. Referring to FIG. 1D, each unit cell 22 includes a data bit 21 indicating 0 or 1, and the data bit 21 has the size of a radius R. It is assumed that each unit cell 22 has the size of 4R in width and 2R in length. FIG. 1D illustrates a set of unit cells 22 existing in three rows m1, m2, and m3. Here, each phase difference between positions of data bits 21 located up and down (m1 and m2 or m2 and m3) is 180°.

Figure 2:
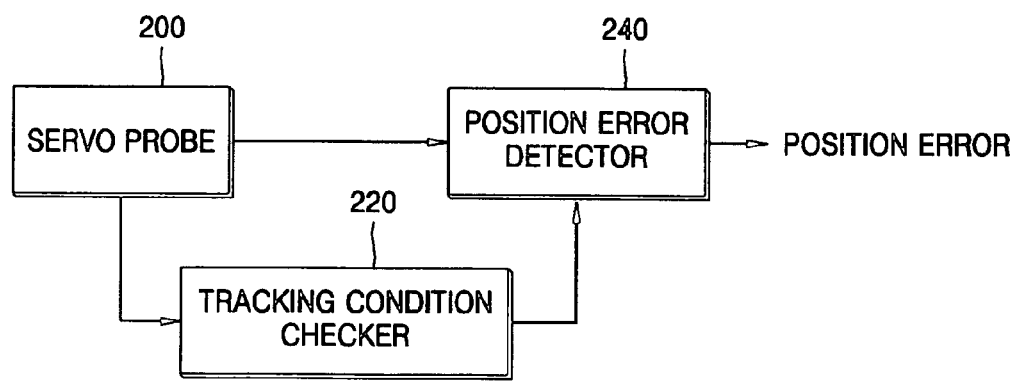
FIG. 2 is a block diagram of a probe position error detecting apparatus in a probe-based data storage system according to an exemplary embodiment of the present invention.

FIG. 2 is a block diagram of a probe position error detecting apparatus in a probe-based data storage system according to an exemplary embodiment of the present invention. The probe position error detecting apparatus includes a servo probe 200, a tracking condition checker 220, and a position error detector 240.

The servo probe 200 scans servo fields of a data storage medium. The tracking condition checker 220 checks whether the servo probe 200 satisfies a predetermined tracking condition when tracking. The tracking condition indicates whether the servo probe 200 consecutively scans "1" bits of codewords of predetermined servo codes. Here, the servo codes are Gray codes, having a Hamming distance of 1 and satisfying alternately existing conditions for Q (a natural number) and Q+1, which are the numbers of "1" bits of codewords of the Gray codes. Also, the servo codes may further satisfy a condition that codewords of the servo codes are unique.

The position error detector 240 detects a probe position error from a signal read by the servo probe 200 satisfying the tracking condition.

Figure 3:
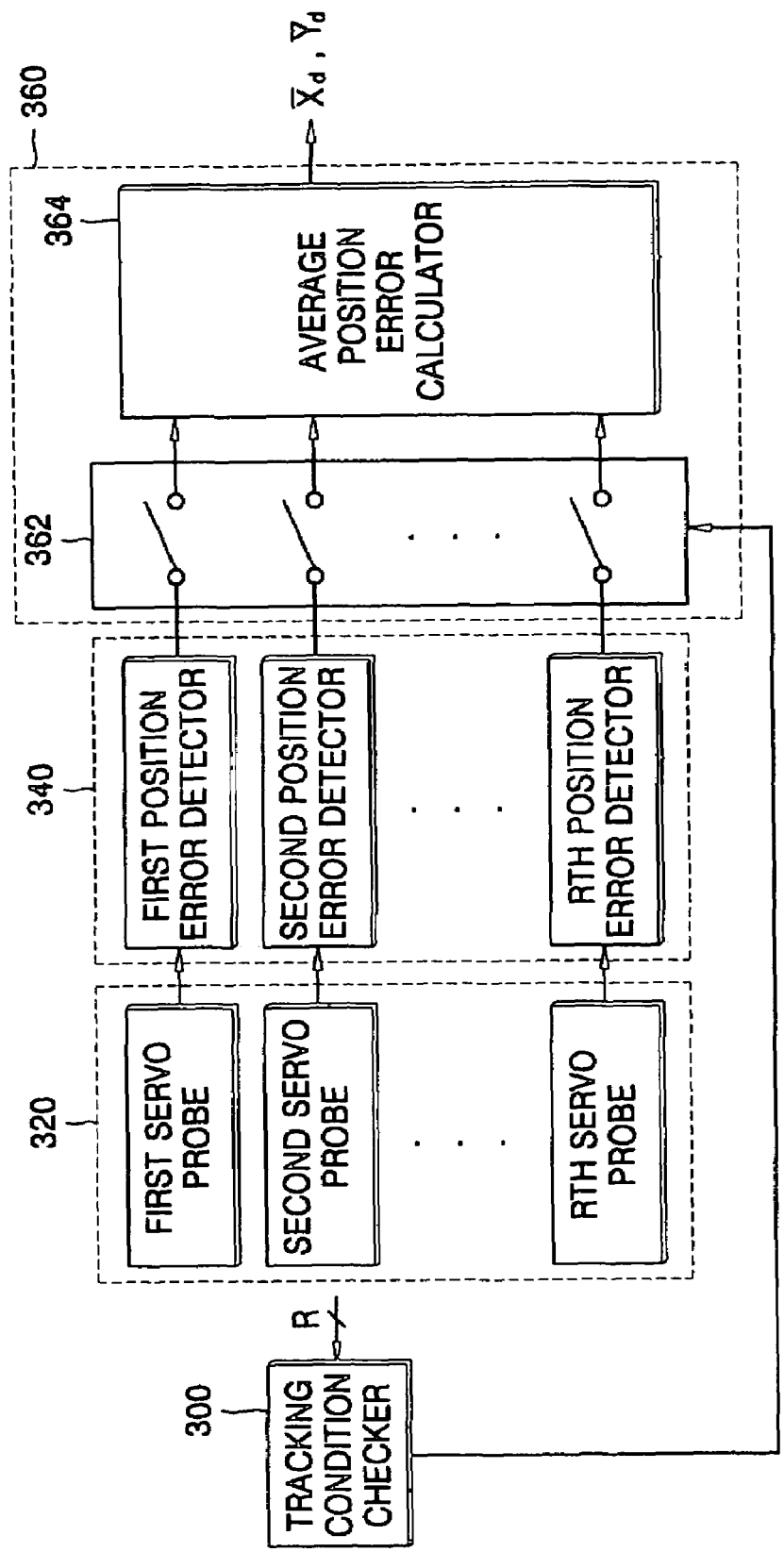
FIG. 3 is a block diagram of a probe position error detecting apparatus in a probe-based data storage system according to another exemplary embodiment of the present invention.

FIG. 3 is a block diagram of a probe position error detecting apparatus in a probe-based data storage system according to another exemplary embodiment of the present invention. The probe position error detecting apparatus includes a tracking condition checker 300, a plurality of servo probes 320, a plurality of position error detectors 340, and an average position error calculating unit 360.

The plurality of servo probes 320 scan servo fields of a data storage medium and designate data fields of the data storage medium. The tracking condition checker 300 checks whether the servo probes 320 satisfy a predetermined tracking condition. The tracking condition indicates whether each of the servo probes 320 consecutively scans "1" bits of codewords of predetermined servo codes. Here, the servo codes are Gray codes, whose Hamming distance is 1, and the codes satisfy alternately existing conditions for Q (a natural number) and Q+1, which are the numbers of "1" bits of codewords of the Gray codes. Also, the servo codes may further satisfy a condition that codewords of the servo codes are unique.

The plurality of position error detectors 340 correspond to the plurality of servo probes 320, respectively, and detect probe position errors from signals read by the plurality of servo probes 320. The average position error calculating unit 360 calculates a mean value of position errors corresponding to servo probes 320, which consecutively scanned "1" bits, determined by the tracking condition checker 300 among the position errors detected by the plurality of position error detectors 340.

The average position error calculating unit 360 includes a switching unit 362 and an average position error calculator 364. The switching unit 362 performs a switching function for outputting position errors corresponding to servo probes 320 checked by the tracking condition checker 300 among the probe position errors detected by the plurality of position error detectors 340, and ON/OFF states of the switching unit 362 are controlled by the tracking condition checker 300. The average position error calculator 364 calculates a mean value of position errors detected by the plurality of position error detectors 340 and transferred by the switching unit 362.

Also, the average position error calculated by the average position error calculator 364 may be input to a predetermined compensator (not shown) to calculate a compensation value, and the compensation value may be fed back to a data tracking system of the probe-based data storage system to compensate for a probe position error.

Figure 4:
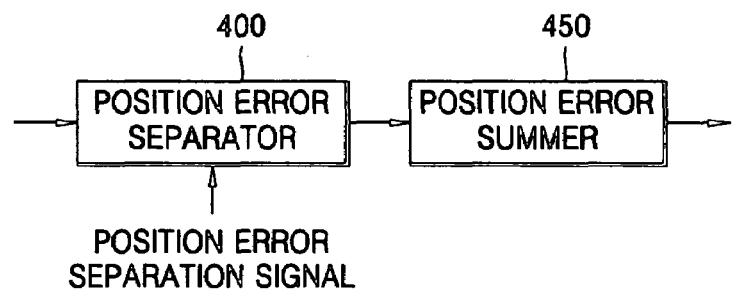
FIG. 4 is a detailed block diagram of each of a plurality of position error detectors.

FIG. 4 is a detailed block diagram of each of the plurality of position error detectors 340. Referring to FIG. 4, each position error detector 340 includes a position error separator 400 and a position error summer 450.

The position error separator 400 separates a probe position error from a signal read by its associated servo probe 320 and may be a multiplier multiplying the signal read by the servo probe 320 by a predetermined error separation signal for separating the probe position error. The position error summer 450 sums position errors detected by the position error separator 400 in a predetermined time unit and may be an integrator integrating a signal output from the multiplier in one cycle unit of the error separation signal.

When a synchronization error and a track error are detected as a probe position error, the error separation signal needs a signal for detecting the synchronization error and a signal for detecting the track error. The synchronization error is an error separation signal of a horizontal component of a position error and is a square wave having a period determined by a ratio of a distance between data bits of the data storage medium to a scanning speed of the servo probe and having a 50% duty cycle. The track error is an error separation signal of a vertical component of the position error and is a square wave, which has double the period of the horizontal error separation signal and is synchronized with the horizontal error separation signal.

The multiplier includes a horizontal multiplier multiplying a signal read by the servo probe by the horizontal error separation signal and a vertical multiplier multiplying the signal read by the servo probe by the vertical error separation signal. The integrator includes a horizontal integrator integrating a signal output from the horizontal multiplier and a vertical integrator integrating a signal output from the vertical multiplier.

Figure 5:
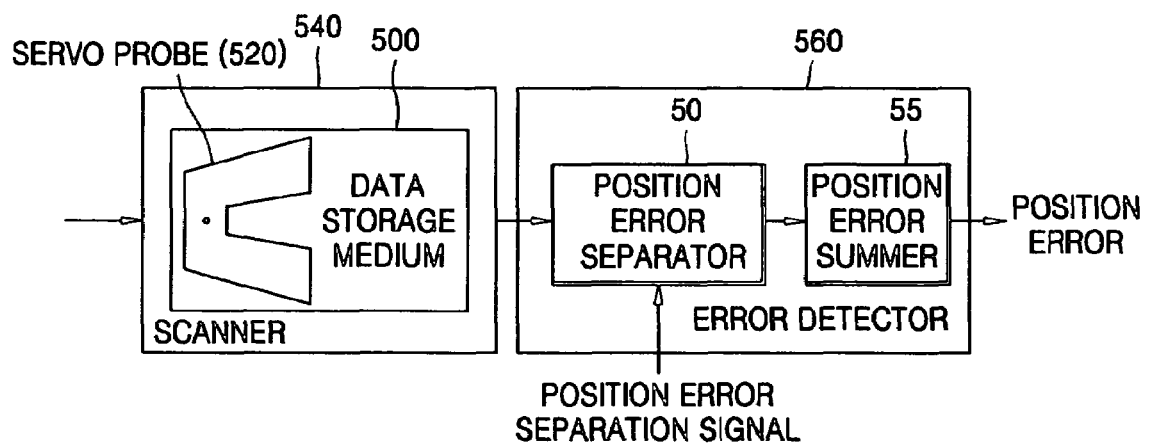
FIG. 5 is a block diagram of a probe position error detecting apparatus in a probe-based data storage system based on one servo probe.

FIG. 5 is a block diagram of a probe position error detecting apparatus in a probe-based data storage system based on one servo probe. The probe position error detecting apparatus includes a data storage medium 500, a servo probe 520, a scanner 540, and an error detector 560. The data storage medium 500 is a recording medium storing data therein.

The scanner 540 moves the data storage medium 500 and is also called an xy stage. The servo probe 520 reads information from a servo field of the data storage medium 500 moved by the scanner 540.

The error detector 560 detects a probe position error by providing a predetermined error separation signal for separating the probe position error to a signal read by the servo probe 520 and corresponds to the probe position error detecting apparatus. The error detector 560 includes a position error separator 50 and a position error summer 55.

Figure 6:
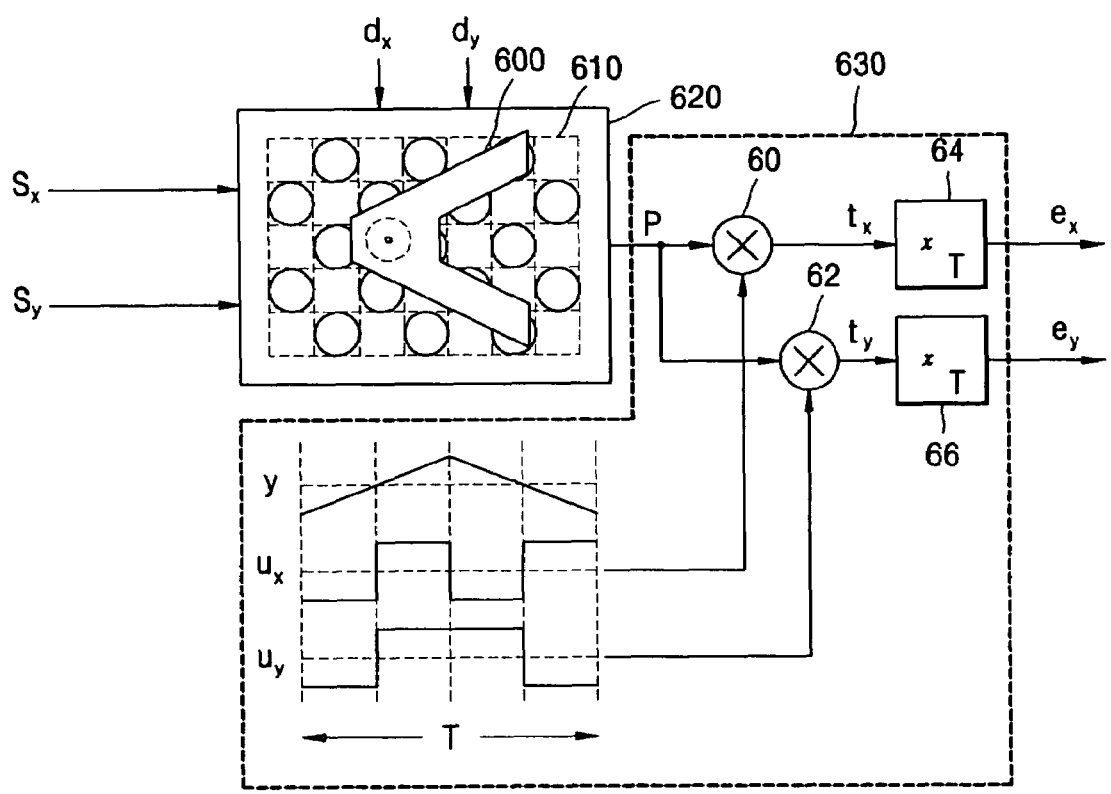
FIG. 6 is a detailed block diagram of the probe position error detecting apparatus of FIG. 5.

FIG. 6 is a detailed block diagram of the probe position error detecting apparatus of FIG. 5. The probe position error detecting apparatus includes a servo probe 600 writing and reading data, a data storage medium 610 on which data is recorded, a scanner 620 moving the data storage medium 610, and an error detector 630 extracting error components of a scan direction (x-axis direction) and its perpendicular direction (y-axis direction) from a data reading signal.

The servo probe 600 can write or read data when moving above the data storage medium 610 under control of the scanner 620. The error detector 630 detects errors of the scan direction (x-axis direction) and its perpendicular direction (y-axis direction), i.e., a synchronization error corresponding to a horizontal position error and a track error corresponding to a vertical position error.

The error detector 630 includes a horizontal multiplier 60, a vertical multiplier 62, a horizontal integrator 64, and a vertical integrator 66. The horizontal multiplier 60 multiplies a signal P read by the servo probe 600 by a horizontal error separation signal $u_x$. The vertical multiplier 62 multiplies the signal P read by the servo probe 600 by a vertical error separation signal $u_y$. The horizontal integrator 64 generates a synchronization error $e_x$ by integrating a signal $t_x$ output from the horizontal multiplier 60 in one cycle unit T. The vertical integrator 66 generates a track error $e_y$ by integrating a signal $t_y$ output from the vertical multiplier 62 in one cycle unit T.

Figure 7:
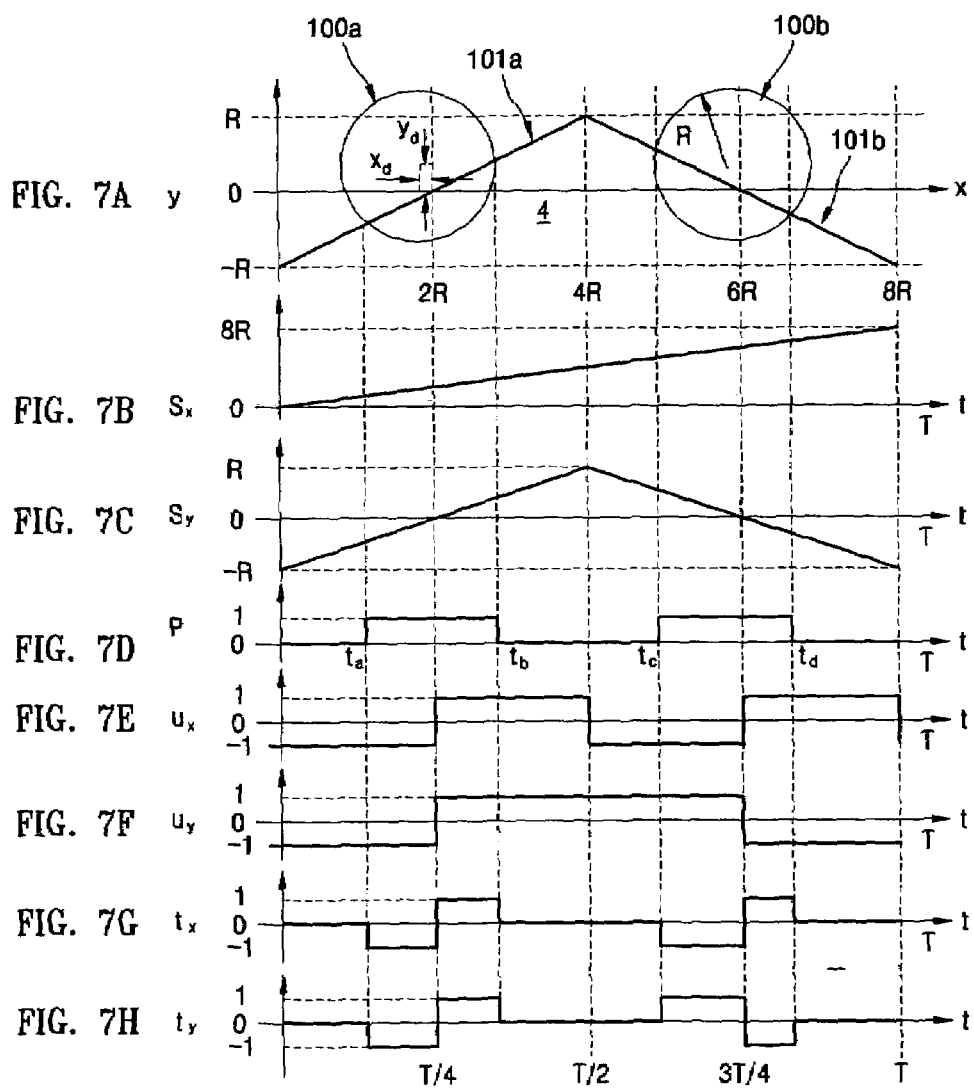
FIG. 7 illustrates timing diagrams for describing the probe position error detecting apparatus of FIG. 6.
Figure 8:
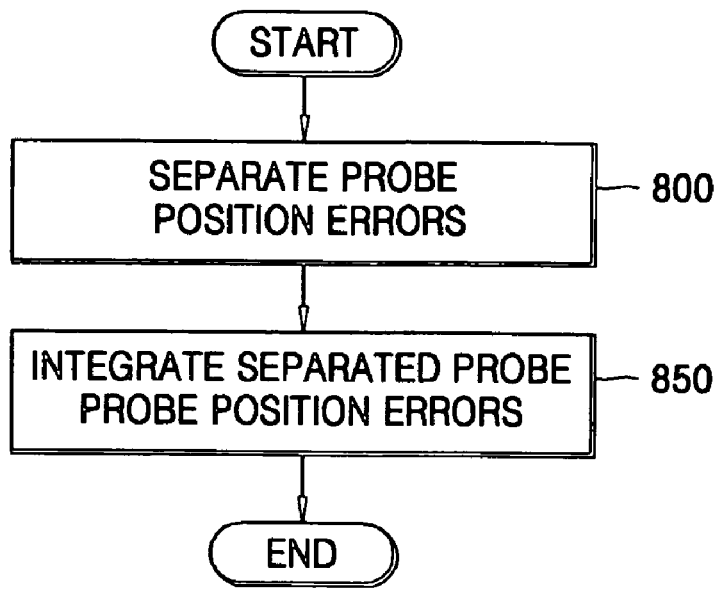
FIG. 8 is a flowchart illustrating a probe position error detecting method in a probe-based data storage system based on one servo probe.

FIG. 7 illustrates timing diagrams for describing the probe position error detecting apparatus of FIG. 6. FIG. 8 is a flowchart illustrating a probe position error detecting method in a probe-based data storage system based on one servo probe.

An operation of the probe position error detecting apparatus in the probe-based data storage system based on one servo probe shown in FIGS. 5 and 6 will now be described with reference to FIGS. 7 and 8.

As shown in FIG. 7B, the scanner 620 is moved by a scan signal $S_x$ for moving the scanner 620 in the x-axis direction at a constant speed. Simultaneously, as shown in FIG. 7C, the scanner 620 is vibrated by a vibration signal $S_y$ in a direction perpendicular to the scan direction using a chopping wave having a period T and a slope 8R/T. If there exists a disturbance, it is assumed that the disturbance can be divided into an x-axis disturbance component $d_x$ and a y-axis disturbance component $d_y$, and an error of ($x_d$, $y_d$) is generated due to the disturbance ($d_x$, $d_y$) as shown in FIG. 7A from the center of the data position.

As shown in FIG. 7A, the servo probe 600 reads data from the data storage medium 610 when moving according to a locus 101a and 101b by the scan signal $S_x$ and vibration signal $S_y$. That is, when the servo probe 600 is moved over recorded data 100a and 100b, the servo probe 600 generates an 'on' signal, and when the servo probe 600 is not moved over the recorded data 100a and 100b, the servo probe 600 generates an 'off' signal. Accordingly, a read signal P is generated as shown in FIG. 7D. Here, it is assumed that the amplitude of the read signal P is 1.

When data is read from the data storage medium 610, a probe position error is detected. The probe position error will now be described in more detail.

Intersections between the probe locus 101a and the recorded data 100a are generated at times $t_a$ and $t_b$, and intersections between the probe locus 101b and the recorded data 100b are generated at times $t_c$ and $t_d$. The x-axis component error $x_d$ and the y-axis component error $y_d$, i.e., the synchronization error and the track error, respectively, are separated and extracted from the read signal P in operation 800.

To do this, extraction signals $u_x$ and $u_y$ shown in FIGS. 7E and 7F related to a y-axis locus (y of FIG. 6) of the servo probe 600 are generated (it is assumed each amplitude is 1). As shown in Equations 1 and 2, signals $t_x$ and $t_y$ shown in FIGS. 7G and 7H are generated by multiplying the read signal P by extraction signals $u_x$ and $u_y$, respectively.

$$t_x = u_x \times P \quad \text{[Equation 1]}$$

$$t_y = u_y \times P \quad \text{[Equation 2]}$$

The signals $t_x$ and $t_y$ are integrated in one cycle unit T in operation 850. That is, if the signals $t_x$ and $t_y$ are integrated by the horizontal integrator 64 and the vertical integrator 66 as shown in Equations 3 and 4, the probe position error is separated, and error components ($e_x$ and $e_y$ of FIG. 6) due to disturbance components corresponding to the x-axis and the y-axis can be obtained.

$$e_x = \int_T t_x dt = -\int_{t_a}^{T/4} dt + \int_{T/4}^{t_b} dt - \int_{t_c}^{3T/4} dt + \int_{3T/4}^{t_d} dt = \frac{2}{5}\frac{T}{R}x_d \quad \text{[Equation 3]}$$

$$e_y = \int_T t_y dt = -\int_{t_a}^{T/4} dt + \int_{T/4}^{t_b} dt + \int_{t_c}^{3T/4} dt - \int_{3T/4}^{t_d} dt = \frac{1}{5}\frac{T}{R}y_d \quad \text{[Equation 4]}$$

As shown in Equations 3 and 4, the estimated synchronization error $e_x$ and track error $e_y$ are only functions of actually generated synchronization error and track error and are linear.

Also, the position error detecting method according to the present exemplary embodiment can be applied as it is when the scanner 620 does not vibrate in the direction perpendicular to the scan direction, i.e., when the synchronization error of the scan direction is compensated for. That is, here, since $S_y=0$ and $u_y=0$, $t_y=0$ and $e_y=0$.

Figure 9:
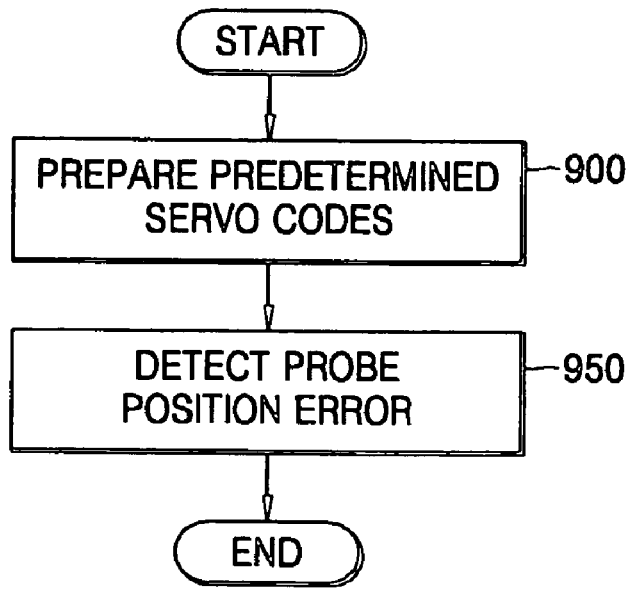
FIG. 9 is a flowchart illustrating a probe position error detecting method in a probe-based data storage system according to an exemplary embodiment of the present invention.

FIG. 9 is a flowchart illustrating a probe position error detecting method in a probe-based data storage system according to an exemplary embodiment of the present invention. Referring to FIG. 9, in the probe position error detecting method in the probe-based data storage system having a data storage medium and a probe detecting data by scanning the data storage medium, the servo codes, described above, are prepared in operation 900. When a servo probe consecutively scans "1" bits of codewords of the servo codes when tracking, a probe position error is detected from a signal read by the servo probe in operation 950.

Figure 10:
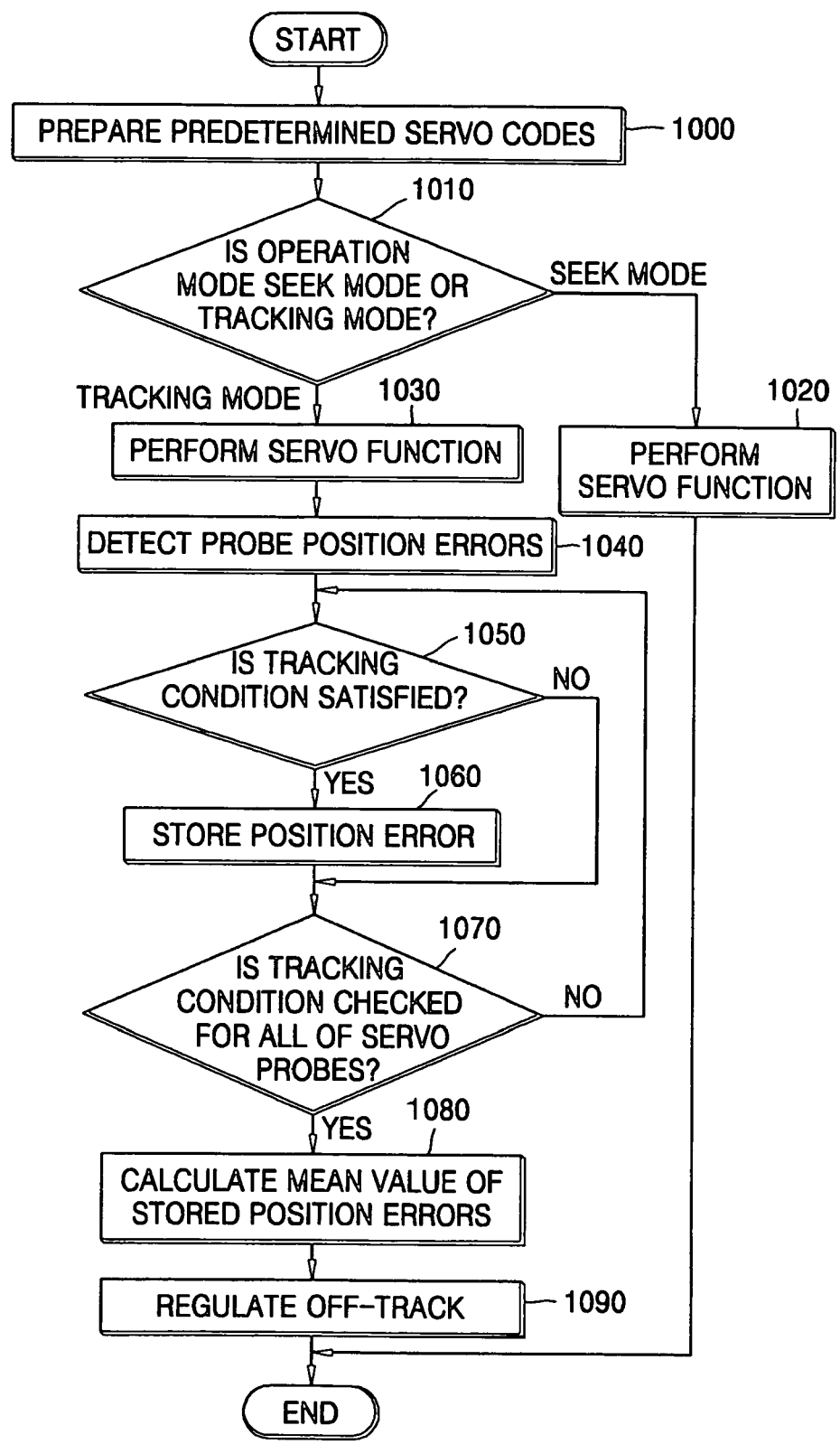
FIG. 10 is a flowchart illustrating a probe position error detecting method in a probe-based data storage system according to another exemplary embodiment of the present invention.

FIG. 10 is a flowchart illustrating a probe position error detecting method in a probe-based data storage system according to another exemplary embodiment of the present invention. An operation of a probe position error detecting apparatus of the probe-based data storage system will now be described in detail with reference to FIGS. 3 and 10.

In order to apply the present exemplary embodiment to the probe position error detecting apparatus, servo codes satisfying predetermined conditions are prepared in operation 1000. That is the servo codes must satisfy the predetermined conditions. First, the servo codes are Gray codes, whose Hamming distance is 1. Second, Q (a natural number) and Q+1, which are the numbers of "1" bits of codewords of the Gray codes, must alternately exist. Third, codewords of the servo codes must be unique. The third condition is an additional condition, and codewords, which do not satisfy the third condition, are not used for the servo codes.

It is determined whether an operation mode of the probe-based data storage system is a seek mode or a tracking mode in operation 1010. If the operation mode is the seek mode, a servo function is performed in operation 1020. In the servo function, each servo probe seeks a servo field and designates specific data in a data field.

If the operation mode is the tracking mode, the servo function is performed in operation 1030, and then a tracking function of detecting a probe position error is performed in operation 1040. The position error detection is performed by the plurality of position error detectors 340 with respect to the plurality of servo probes 320. A process of detecting the probe position error using each of the plurality of servo probes 320 was described with reference to FIGS. 4 through 8. Accordingly, description of the probe position error detecting process will not be repeated.

It is checked whether the plurality of servo probes 320 satisfy a tracking condition using the tracking condition checker 300 in operation 1050. The tracking condition indicates whether each servo probe 320 consecutively scans "1" bits of codewords of the servo codes as described above.

If a servo probe 320 satisfies the tracking condition, a position error corresponding to the servo probe 320 is stored in operation 1060.

It is determined whether the tracking condition is checked for all of the servo probes 320 in operation 1070. Until there does not exist even one servo probe 320 for which the tracking condition is not checked, operation 1050 is repeatedly performed. If all of the servo probes 320 are checked whether the servo probes 320 satisfy the tracking condition, a mean value of stored position errors is obtained by the average position error calculator 364 in operation 1080.

In order to perform data estimation of the data storage system, an off-track is regulated by feeding back the average position error in operation 1090.

Figure 11:
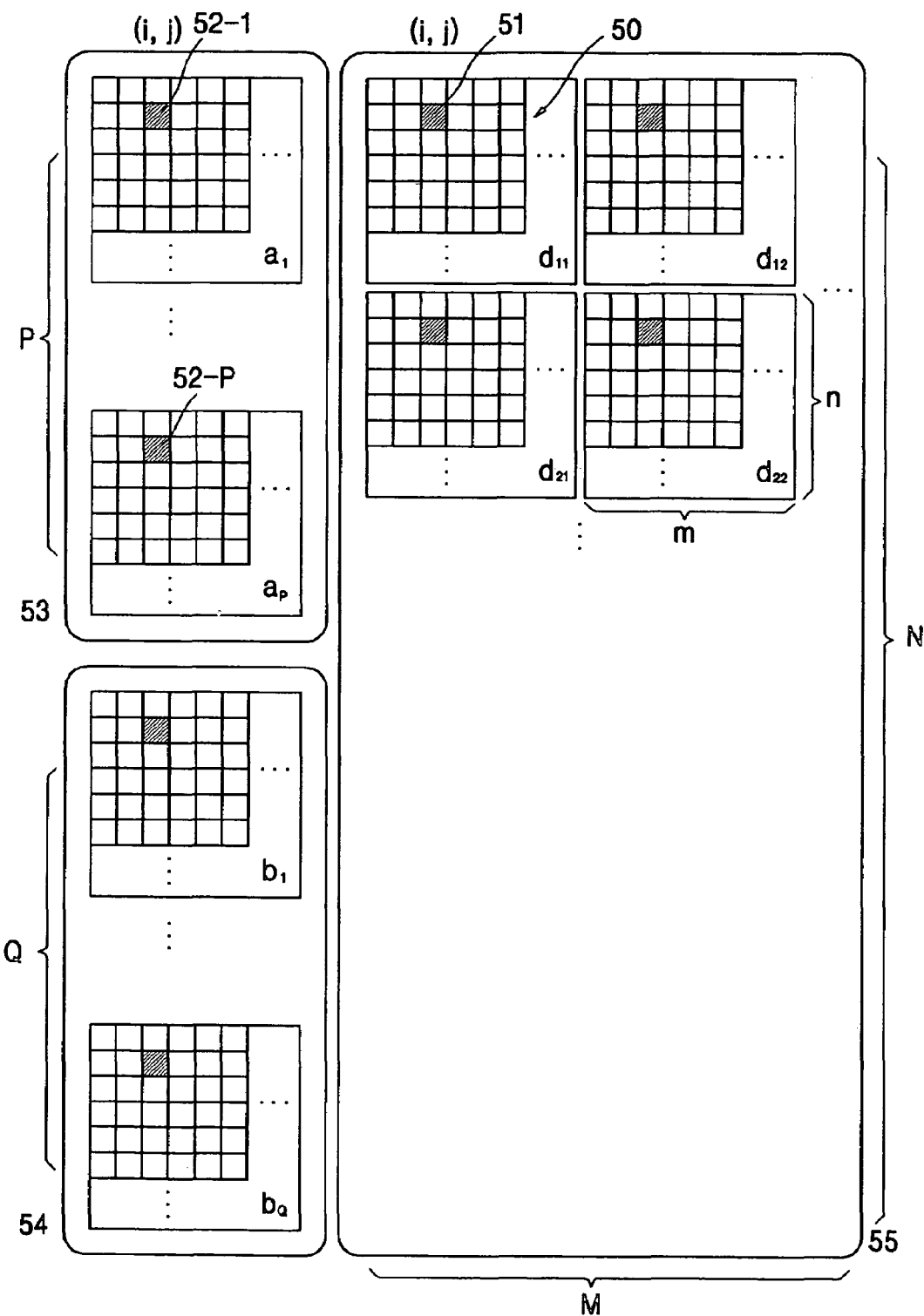
FIG. 11 illustrates that when the number of bits of a data field is n×m, the number of coordinates (i, j) of data to be written or read is n×m, and the same number of servo codes are necessary.

A concept of the present exemplary embodiment will now be described in more detail. As shown in FIG. 11, when the number of bits of a data field 50 is n×m, the number of coordinates (i, j) 51 of data to be written or read is n×m, and the same number of servo codes S are necessary. The servo codes S can be represented using a Gray code generation function G as shown in Equation 5.

$$S \leftarrow G(P) \quad \text{[Equation 5]}$$

Here, P denotes the number of servo probes and is an integer satisfying $P \geq \log_2(n \times m)$.

Bits of one codeword $s_k$ of the servo codes S indicating the coordinates (i, j) 51 denote data 52-1 through 52-P read by their associated servo probes, respectively.

$$s_k = a_1 a_2 a_3 \ldots a_P \quad \text{[Equation 6]}$$

If the Gray code generation function G satisfies a correlation between adjacent codewords as shown in Equation 7, there is no further requirement. Accordingly, the Gray code generation function G can be variously defined.

$$d(s_k, s_{k+1}) = 1 \quad \text{[Equation 7]}$$

Here, d(a, b) is a Hamming weight, and defined as the number of different bits between codewords a and b. In order to write and read data at an exact position, a tracking algorithm is necessary.

In an actually detected position error, noise of a data radius, noise of a data position, and noise generated by a signal detector are included. In order to reduce these noise effects, a plurality of tracking probes may be used. That is, noise can be reduced by averaging position errors detected by the plurality of tracking probes.

Therefore, P servo fields 53, P servo probes corresponding to the P servo fields 53, Q tracking fields 54 for tracking, and Q tracking probes corresponding to the Q tracking fields 54 are necessary.

Figure 12:
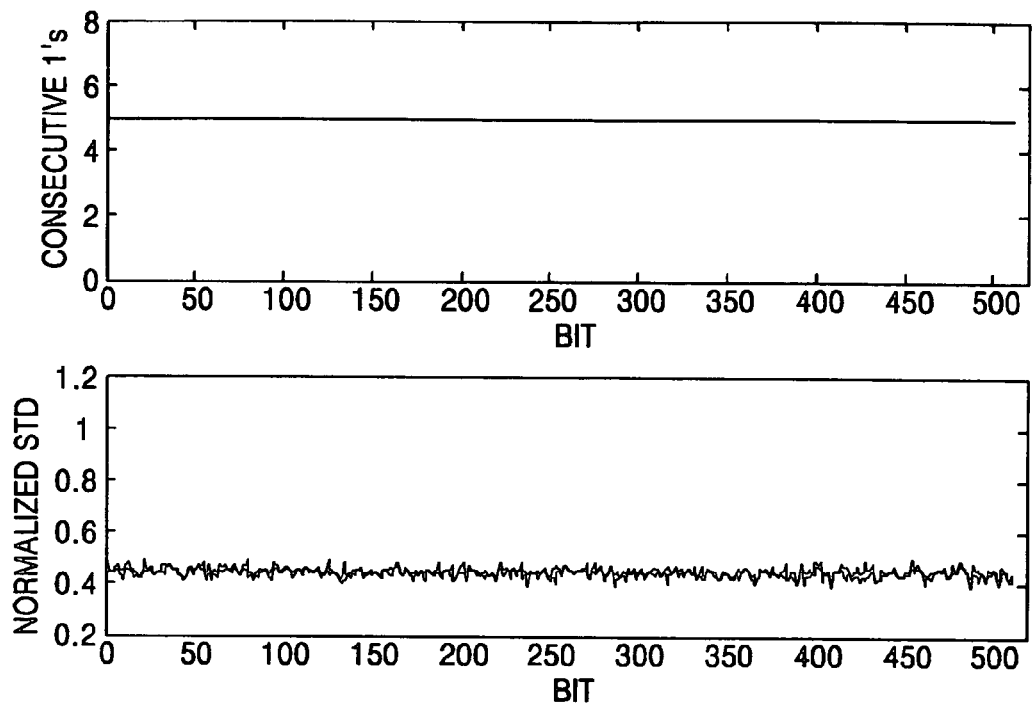
FIG. 12 illustrates a noise characteristic detected when the number of consecutive 1's recorded on a tracking field in one cycle is 5, wherein when the number of data bits of a data field is 512, 9 servo probes are necessary and 5 tracking probes are necessary for securing at least a 50% noise reduction rate.

For example, if the number of data bits in a data field is 512, 9 servo probes are necessary, and in order to secure a noise reduction rate of at least 50%, 5 tracking probes are necessary ($1/\sqrt{5} \approx 0.45$). In this case, the number of consecutive 1's recorded in a tracking field in one cycle, which is a position error detecting condition, is 5, and in a case where the standard deviation of noise included in an error detected by one tracking probe is 1, a characteristic of noise included in a mean value of errors detected by a plurality of tracking probes is as shown in FIG. 12.

Figure 13:
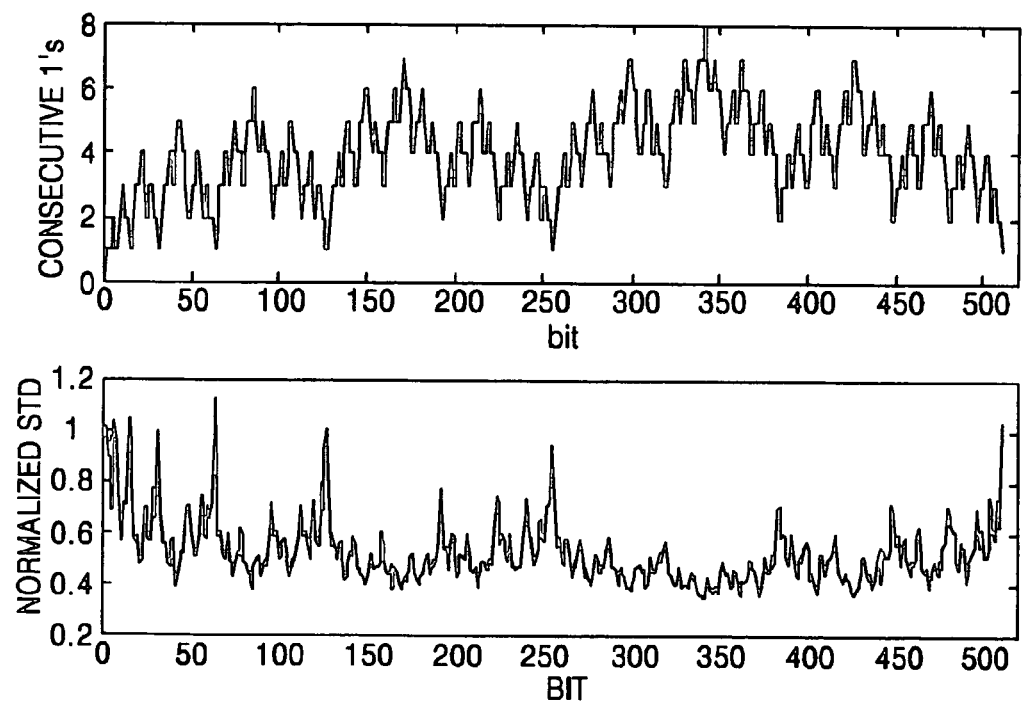
FIG. 13 illustrates the number of consecutive 1's and a noise characteristic when position errors are detected using only servo probes and servo codes and not using tracking probes.

If position errors are detected using not tracking probes but only servo probes and servo codes, which are binary reflected Gray codes recorded in servo fields, satisfying the error detecting condition described above, the number of consecutive 1's and a characteristic of noise included in a mean value of errors detected by a plurality of servo probes satisfying a tracking condition of a case where the standard deviation of noise included in an error detected by one servo probe is 1 are as shown in FIG. 13.

In the case of the former, the number of probes used is 14 and position errors are detected with a stable noise characteristic. In contrast, in the case of the latter, the number of probes used is 9 and position errors are detected with an unstable noise characteristic.

In the present exemplary embodiment, it is important that servo codes are generated so that position errors can be detected with a stable noise characteristic using a less number of probes. Servo codes H used in the present exemplary embodiment are generated by a code generation function G(R;Q) as shown in Equation 8.

$$H \leftarrow G(R;Q) \quad \text{[Equation 8]}$$

Here, R denotes the number of probes required for servo and tracking, and Q denotes the number of probes used for tracking among R probes.

The code generation function G(R;Q) has constraint conditions as shown in Equation 9 through 11.

$$d(h_k, h_{k+1}) = 1 \quad \text{[Equation 9]}$$

$$w(h_k) = Q \text{ and } w(h_{k+1}) = Q+1 \text{ ($k$ is an odd number)} \quad \text{[Equation 10]}$$

H: Hamilton path. [Equation 11]

In Equation 10, w(α) denotes a Hamming weight and is defined as the number of bits, whose values are not 0 in a codeword α, and Q denotes the number of tracking probes.

Equation 11 means that H has a Hamilton path.

If there exist servo codes generated by the code generation function G(R;Q) having the constraint conditions, then $2 \times \min\{_R C_Q, _R C_{Q+1}\}$ coordinates can be represented.

In order to generate servo codes having the constraint conditions, $a_k$ defined as seed codes is generated so that $a_k$ has constraint conditions as shown in Equations 12 through 15.

$$w(a_k)=Q \quad \text{[Equation 12]}$$

$$w(a_{k-1}+a_k+a_{k+1})=Q+2 \quad \text{[Equation 13]}$$

$$d(a_k,a_{k+1})=2 \quad \text{[Equation 14]}$$

$$a_k|a_{k+1} \neq a_n|a_{n+1}(\square k \neq n) \quad \text{[Equation 15]}$$

A final servo code $h_k$ is disposed as shown in Equation 16.

$$\{h_k\}=a_1,(a_1|a_2),a_2,(a_2|a_3),a_3, \quad \text{[Equation 16]}$$

Figure 14:
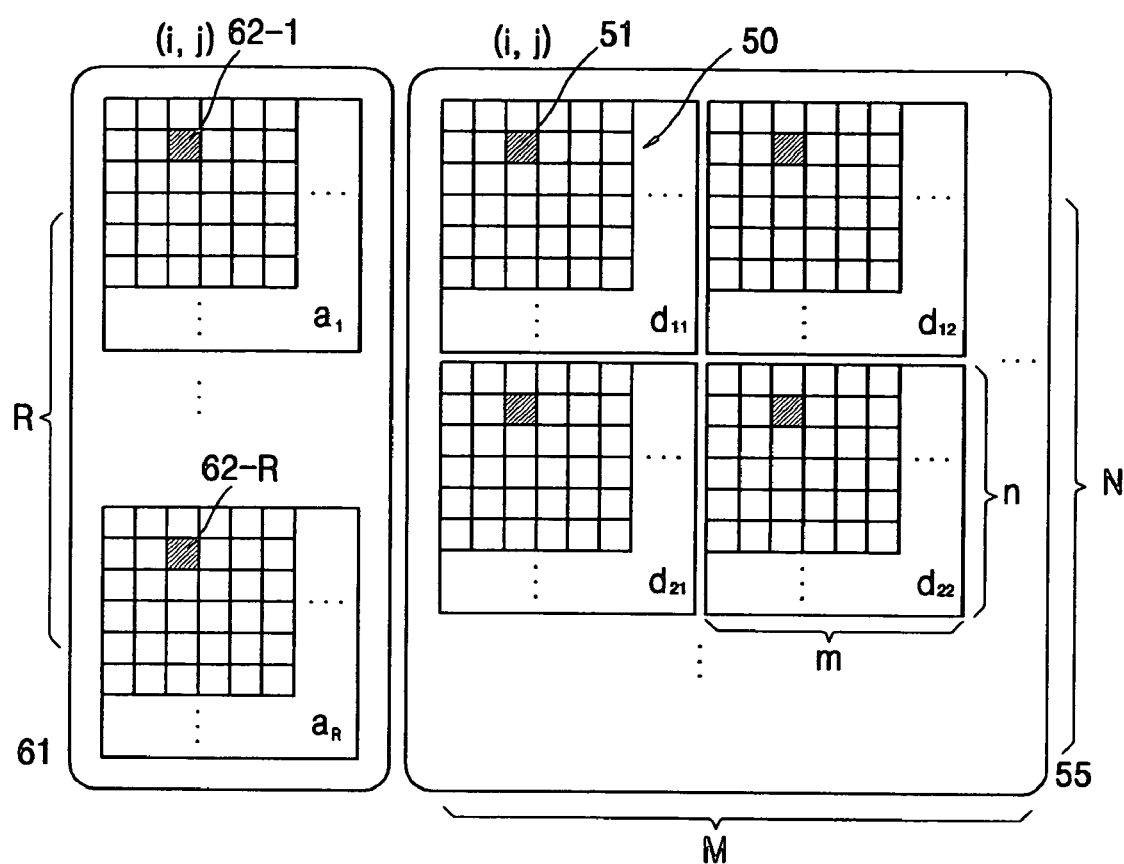
FIG. 14 illustrates a servo field and a data field of a data storage medium to which the servo codes are applied.

In order to easily generate the seed codes $a_k$, if the constraint condition of Equation 15 is ignored, since only coordinates denoted by $a_k$ (k is an odd number) are unique, absolute encoding of all of bit coordinates in fields cannot be performed. Therefore, servo probes are operated only at positions in which $w(h_k)=Q$, and the servo probes are not operated since more than one coordinates are indicated at positions in which $w(h_k)=Q+1$. Therefore, the servo codes have 2 $_RC_Q$ codewords. In the servo codes, $_RC_Q$ servo codes, in which $w(h_k)=Q$, can indicate coordinates of data fields and $_RC_Q$ servo codes in which $w(h_k)=Q+1$, satisfy the tracking condition. FIG. 14 illustrates servo fields and data fields of a data storage medium to which the servo codes are applied.

Figure 15:
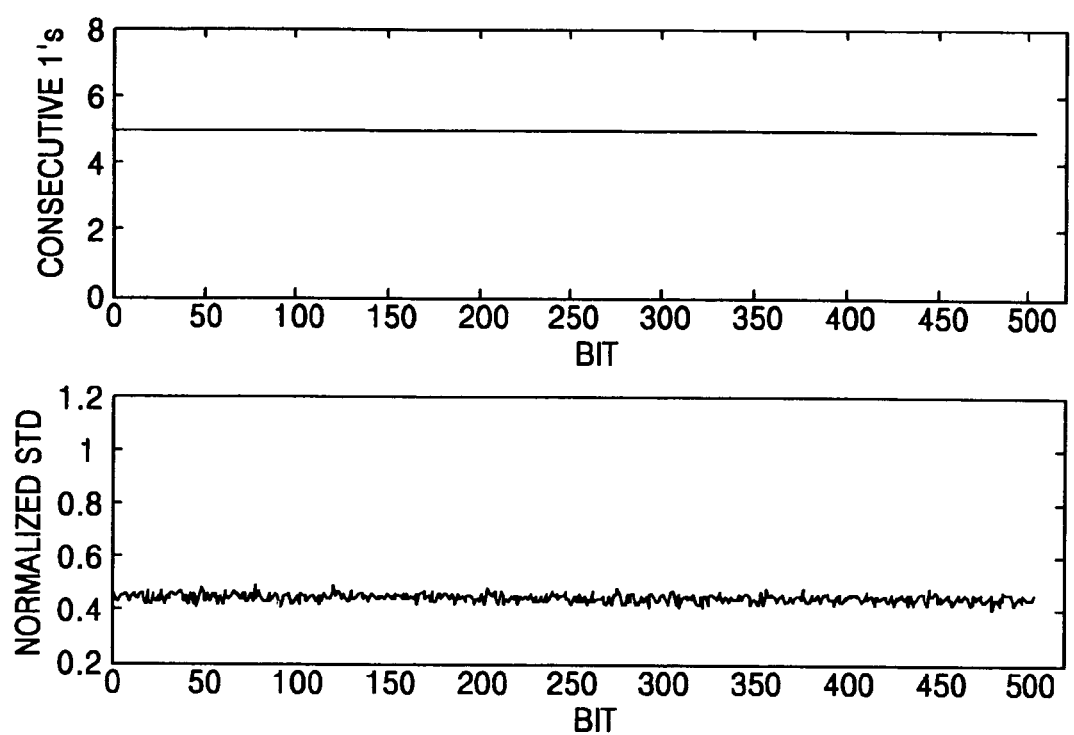
FIG. 15 illustrates that position errors are detected, using servo codes generated when R=10 and Q=5, in a state in which 504 coordinates are designated, a noise reduction rate of more than 50% is secured and a noise characteristic is stable.

FIG. 15 illustrates that 504 coordinates are designated using servo codes generated when R=10 and Q=5, and position errors are detected by securing a noise reduction rate of at least 50% and have a stable noise characteristic of noise included in a mean value of errors detected by a plurality of servo probes satisfying a tracking condition of a case where the standard deviation of noise included in an error detected by one servo probe is 1.

As described above, by using a probe position error detecting method and apparatus according to exemplary embodiments of the present invention, probe position errors can be detected using fewer probes. Also, the probe position errors can be detected with a stable noise characteristic.

The present invention may be embodied in a general-purpose computer (all kinds of devices having a data processing function are included) by running a program from a computer-readable medium, including but not limited to storage media such as magnetic storage media (ROMs, RAMs, floppy disks, magnetic tapes, etc.), optically readable media (CD-ROMs, DVDs, etc.), and probe readable media.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A probe position error detecting method in a probe-based data storage system including a data storage medium and a probe detecting data by scanning the data storage medium, the method comprising:
   preparing servo codes, which are Gray codes having a Hamming distance of 1 and satisfying alternate conditions for Q and Q+1, wherein Q is a natural number and the conditions are numbers of "1" bits of codewords of the Gray codes; and
   detecting a probe position error from a signal read by a servo probe when the servo probe consecutively scans "1" bits of codewords of the servo codes when tracking.

2. The method of claim 1, wherein the servo codes further satisfy a condition that codewords of the servo codes are unique.

3. A probe position error detecting method in a probe-based data storage system including a data storage medium and probes detecting data by scanning the data storage medium, the method comprising:
   preparing servo codes, which are Gray codes having a Hamming distance of 1 and satisfying alternate conditions for Q and Q+1, wherein Q is a natural number and the conditions are numbers of "1" bits of codewords of the Gray codes;
   detecting position errors of a plurality of servo probes from signals read by the plurality of servo probes, respectively;
   determining whether each of the plurality of servo probes satisfies a tracking condition of consecutively scanning "1" bits of codewords of the servo codes; and
   calculating an average position error by averaging probe position errors corresponding to servo probes satisfying the tracking condition.

4. The method of claim 3, wherein the servo codes further satisfy a condition that codewords of the servo codes are unique.

5. The method of claim 3 or 4, wherein the detecting the position errors comprises:
   separating an associated probe position error from a signal read by each servo probe; and
   integrating the probe position errors over predetermined time units.

6. The method of claim 5, wherein the separating the associated probe position error comprises multiplying a signal read by each servo probe by a error separation signal for separating its associated probe position error.

7. The method of claim 6, wherein the error separation signal is a square wave having a period determined by a ratio of a distance between data bits of the data storage medium to a scanning speed of the servo probe and a 50% duty cycle.

8. The method of claim 6, wherein the error separation signal comprises:
   a horizontal error separation signal, which is a square wave having a period determined by a ratio of a distance between data bits of the data storage medium to a scanning speed of the servo probe and a 50% duty cycle; and
   a vertical error separation signal, which has double the period of the horizontal error separation signal and is synchronized with the horizontal error separation signal; and
   wherein the separating the associated probe position error comprises:
   multiplying a signal read by the servo probe by the horizontal error separation signal; and
   multiplying the signal read by the servo probe by the vertical error separation signal; and
   wherein the integrating the probe position errors comprises:
   integrating a multiplication value of the horizontal error separation signal for a predetermined time; and
   integrating a multiplication value of the vertical error separation signal for a predetermined time.

9. A probe position error detecting apparatus in a probe-based data storage system including a data storage medium and a probe detecting data by scanning the data storage medium, the apparatus comprising:
   a servo probe which scans a servo field of the data storage medium;

a tracking condition which checks a tracking condition checker that the servo probe consecutively scans "1" bits of codewords of the servo codes when tracking, wherein servo codes are Gray codes having a Hamming distance of 1 and satisfying alternate conditions for Q and Q+1, wherein Q is a natural number and the conditions are numbers of "1" bits of codewords; and a position error detector which detects a probe position error from a signal read by the servo probe satisfying the tracking condition.

10. The apparatus of claim 9, wherein the servo codes further satisfy a condition that codewords of the servo codes are unique.

11. A probe position error detecting apparatus in a probe-based data storage system including a data storage medium and probes detecting data by scanning the data storage medium, the apparatus comprising:

a plurality of servo probes;

a tracking condition checker that checks a tracking condition that the servo probes consecutively scan "1" bits of codewords of the servo codes when tracking, wherein the servo codes are Gray codes having a Hamming distance of 1 and satisfying alternate conditions for Q and Q+1, respectively, wherein Q is a natural number and the conditions are numbers of "1" bits of codewords;

a plurality of position error detectors which correspond to the plurality of servo probes, respectively, and detect probe position errors from signals read by the plurality of servo probes; and an average position error calculator which calculates a mean value of position errors corresponding to servo probes, which consecutively scanned "1" bits, determined by the tracking condition checker among the position errors detected by the plurality of position error detectors.

12. The apparatus of claim 11, wherein the servo codes further satisfy a condition that codewords of the servo codes are unique.

13. The apparatus of claim 11 or 12, wherein each of the position error detectors comprise:

a position error separator which separates a probe position error from a signal read by its associated servo probe; and a position error summer which sums position errors detected by the position error separator in a predetermined time unit.

14. The apparatus of claim 13, wherein the position error separator is a multiplier which multiplies the signal read by the servo probe by an error separation signal to separate the probe position error, and the position error summer is an integrator which integrates a signal output from the multiplier in one cycle unit of the error separation signal.

15. The apparatus of claim 14, wherein the error separation signal is a square wave having:

a period determined by a ratio of a distance between data bits of the data storage medium to a scanning speed of the servo probe; and a 50% duty cycle.

16. The apparatus of claim 15, wherein the error separation signal comprises:

a horizontal error separation signal, which is a square wave having a period determined by a ratio of a distance between data bits of the data storage medium to a scanning speed of the servo probe and a 50% duty cycle; and a vertical error separation signal, which has double the period of the horizontal error separation signal and is synchronized with the horizontal error separation signal; and wherein the multiplier comprises:

a horizontal multiplier which multiplies a signal read by the servo probe by the horizontal error separation signal; and a vertical multiplier which multiplies the signal read by the servo probe by the vertical error separation signal; and wherein the integrator comprises:

a horizontal integrator which integrates a signal output from the horizontal multiplier; and a vertical integrator which integrates a signal output from the vertical multiplier.

17. A computer readable medium having recorded thereon a computer readable program for performing a probe position error detecting method in a probe-based data storage system including a data storage medium and a probe detecting data by scanning the data storage medium, the method comprising:

preparing servo codes, which are Gray codes having a Hamming distance of 1 and satisfying alternate conditions for Q and Q+1, wherein Q is a natural number and the conditions are numbers of "1" bits of codewords of the Gray codes; and detecting a probe position error from a signal read by a servo probe when the servo probe consecutively scans "1" bits of codewords of the servo codes when tracking.

18. A computer readable medium having recorded thereon a computer readable program for performing a probe-based data storage system including a data storage medium and probes detecting data by scanning the data storage medium, the method comprising:

preparing servo codes, which are Gray codes having a Hamming distance of 1 and satisfying alternate conditions for Q and Q+1, wherein Q is a natural number and the conditions are numbers of "1" bits of codewords of the Gray codes;

detecting position errors of a plurality of servo probes from signals read by the plurality of servo probes, respectively;

determining whether each of the plurality of servo probes satisfies a tracking condition of consecutively scanning "1" bits of codewords of the servo codes; and calculating an average position error by averaging probe position errors corresponding to servo probes satisfying the tracking condition.

* * * * *